United States Patent
Kummamuru et al.

(10) Patent No.: US 11,023,551 B2
(45) Date of Patent: Jun. 1, 2021

(54) DOCUMENT PROCESSING BASED ON PROXY LOGS

(71) Applicant: ACCENTURE GLOBAL SOLUTIONS LIMITED, Dublin (IE)

(72) Inventors: Krishna Kummamuru, Bangalore (IN); Deepak Kumar, Kurmuri (IN); Chetan N. Yadati, Bengaluru (IN); Guruprasad Dasappa, Bangalore (IN); Chung-Sheng Li, San Jose, CA (US)

(73) Assignee: ACCENTURE GLOBAL SOLUTIONS LIMITED, Dublin (IE)

(*) Notice: Subject to any disclaimer, the term of this patent is extended or adjusted under 35 U.S.C. 154(b) by 555 days.

(21) Appl. No.: 15/903,882

(22) Filed: Feb. 23, 2018

(65) Prior Publication Data
US 2019/0266291 A1    Aug. 29, 2019

(51) Int. Cl.
| | |
|---|---|
| G06F 16/00 | (2019.01) |
| G06F 16/955 | (2019.01) |
| H04L 29/08 | (2006.01) |
| G06F 16/93 | (2019.01) |
| G06F 16/9535 | (2019.01) |

(52) U.S. Cl.
CPC ............ *G06F 16/955* (2019.01); *G06F 16/93* (2019.01); *G06F 16/9535* (2019.01); *H04L 67/28* (2013.01)

(58) Field of Classification Search
CPC ............................... G06F 16/955; G06F 16/24
USPC ........................................................ 707/706
See application file for complete search history.

(56) References Cited

U.S. PATENT DOCUMENTS

| | | | | |
|---|---|---|---|---|
| 8,072,467 | B2* | 12/2011 | Bruckner | G06F 16/2455 345/619 |
| 9,128,906 | B2* | 9/2015 | Peters | G06F 40/10 707/707 |
| 10,621,205 | B2* | 4/2020 | Rakshit | G06F 16/283 707/707 |
| 2004/0243545 | A1* | 12/2004 | Boone | G06F 16/313 707/707 |
| 2004/0243551 | A1* | 12/2004 | Boone | G16H 15/00 707/707 |
| 2006/0026122 | A1* | 2/2006 | Hurwood | G06Q 10/10 707/707 |
| 2007/0156670 | A1* | 7/2007 | Lim | G06F 9/468 707/707 |
| 2011/0035369 | A1* | 2/2011 | Halasipuram | G06F 16/24549 707/720 |
| 2013/0267209 | A1* | 10/2013 | Bott | H04L 67/10 455/414.1 |

(Continued)

*Primary Examiner* — Alexandria Y Bromell
(74) *Attorney, Agent, or Firm* — Mannava & Kang, P.C.

(57) ABSTRACT

An information request processor analyzes an information request and automatically selects search queries and information sources that are responsive to the information request. Prior reports and portions of browsing history that were generated during the creation of the prior reports are selected based at least on a primary entity included in the information request. The entities extracted from the prior reports using trained Information Extraction (IE) models are mapped to the search terms extracted from the portions of the browsing history in order to identify the successful search queries that provided the information for the prior reports. A report responsive to the information request can be generated either automatically or by receiving user input that validates and rephrases the successful search queries.

20 Claims, 9 Drawing Sheets

(56) References Cited

U.S. PATENT DOCUMENTS

2014/0280066 A1\* 9/2014 Petschulat ........... G06F 16/2453
707/722
2019/0042703 A1\* 2/2019 Reicher ................. G16H 15/00
707/707

\* cited by examiner

DOCUMENT PROCESSING BASED ON PROXY LOGS

BACKGROUND

The universal use of digital computers in almost every walk of life has lead to generation of immense volumes of data. As a result, complex database management systems are developed to store and retrieve information when requested by users. In addition to maintaining and retrieving information, a database needs to be able to allow users to share the retrieved information. Generally, users may not require long, detailed data sheets that lists hundreds of data rows retrieved from the database. Rather, the users will require aggregated data that conveys the most relevant information for their decision making. Accordingly, many enterprise database systems include tools to generate informative documents that collate data from various databases and present it in a coherent manner as reports that help users to analyze and understand complex data.

Information regarding a subject can be presented in a document in an organized manner through creative use of tables, infographics, images or combinations thereof. Informative documents such as reports may include text, images, numeric or alpha-numeric data. Informative documents or reports can obtain their data from various sources such as flat files, comma separated values (CSV) files, spread sheets, databases and the like. Reports are extensively used for summarizing or identifying and displaying trends derived from the data and or answer specific questions related to one or more entities whose data may be recorded in the databases.

BRIEF DESCRIPTION OF DRAWINGS

Features of the present disclosure are illustrated by way of examples shown in the following figures. In the following figures, like numerals indicate like elements, in which.

DETAILED DESCRIPTION

For simplicity and illustrative purposes, the present disclosure is described by referring to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

According to one or more examples described herein, an information request processing system that receives an information request, identifies prior reports relevant to the information request, extracts portions of browsing history that were generated during the creation of the prior reports and provides for display as knowledge nuggets, data extracted from the proxy server logs and the prior reports is disclosed. The knowledge nuggets may include but are not limited to the search queries used for generating the prior reports, information sources such as the websites on which the search queries were executed and the prior reports. The information request processing system also generates associations between the search terms from the portions of the browsing history and entities in the prior reports. In an example, the knowledge nuggets thus displayed are validated and search queries may be rephrased to obtain a response or report containing the information that was initially sought in the information request. In an example, a report responsive to the information request may also be automatically generated based on correlation of the information request with the search queries extracted from the proxy server logs.

A search behavior analyzer is included in the information request processor. The search behavior analyzer is configured to access a plurality of data sources and select the prior reports from a data source of prior reports and the portions of the browsing history from the proxy server logs. The information request is initially processed to identify a primary entity and one or more informational items. The primary entity may be a company, a person, an organization, a product, a place and the like about which the information is initially sought by the information request. The one or more informational items may include attributes of the primary entity or particular data regarding the primary entity that is sought in the information request. Based at least on the primary entity, one or more domains associated with the information request are identified wherein the domains classify the information request into categories that may be predefined within the information request processor. The domains may also provide a basis of categorization of prior reports in a data store of previously generated reports. Accordingly, the prior reports that are relevant to the information request are selected based on the domains of the information request. Portions of the browsing history that were generated during the creation of the selected prior reports by one or more users are extracted from proxy server logs. The proxy server logs may record the various online activities of users browsing the internet. The proxy server logs can include the websites accessed by the users, the search queries and the search terms used in the search queries by the users, the results obtained in response to the search queries and the like. The portions of browsing history may be identified based on creation dates of the prior reports, IDs of the users who worked on the prior reports, entities included in the prior reports and the like. The prior reports and the portions of the browsing history are parsed and tokenized.

A search association mapper processes the tokens from the search behavior analyzer to establish associations between the entities extracted from the reports and the search terms obtained from the portions of browsing history. Trained information extraction (IE) models may be employed for extracting the entities and the search terms from the output of the search behavior analyzer. In addition, the information regarding the report structures that includes sections and subsections of the prior reports can be obtained from a data source that includes knowledge of the various domains. Natural Language Processing (NLP) techniques such as pattern matching or identifying synonyms using NLP data sources such as dictionaries or domain-specific ontologies may be employed to establish associations between the entities and the search terms. Based on the associations, successful search terms and search queries that provided information included in the prior reports can be identified. The information sources such as the websites that provided the information for the creation of the reports are also identified.

A result generator may display the successful search queries, search terms and the prior reports as knowledge nuggets on one or more graphical user interfaces (GUIs) associated with the information request processor. The result generator may be further configured to receive user input validating the associations established by the search association mapper and/or modifying or rephrasing the search queries that are displayed. In an example the rephrasing of the search queries can include replacing an entity or search term of a search query with the primary entity or a different search term and selecting an information source such as a website to execute the rephrased search query. The rephrased search query is executed on a selected information source to generate a response that may include a report providing the information sought in the information request.

In an example, the result generator may determine if generation of the response to the information request involves a simple substitution of the primary entity to a search term in at least one of the successful search queries. If yes, a new query is generated with the primary entity substituted for a corresponding search term in the at least one search query and the new query is executed on a selected information source. In an example, the new query can be executed on the same information source on which the at least one search query was previously executed. The results obtained from the new query may be used in generating the report. The result generator may have certain default templates associated with the various domains based on the informational items that are likely to be associated with the entities of the domains. Using the primary entity and the informational items in the information request, a default template of the domain corresponding to the primary entity may be selected for the automatic generation of the report.

The information request processor as disclosed herein enables machines to intelligently identify relevant search queries and/or information sources for a given information request and to generate the reports based on execution of the search queries on the information sources. Typically, analysts who obtain details regarding entities such as suppliers with respect to some specific objectives formulate the search queries, select the appropriate information sources and run the search queries on the information sources such as GOOGLE or other domain-specific websites. As a result, the information collection process is rather slow and does not confirm to consistent quality metrics as the quality of the information collected in typical information collection processes depends on the expertise and talent of the analyst who is gathering the information. Currently no solution exists that receives an entity id and informational items and generates an accurate report based on similar prior endeavors. The information request processor provides a technical improvement in that it enables intelligent selection of search queries and data sources in addition to automatic creation of the reports. The information request processor therefore not only improves consistency in the report quality but also enables faster and more accurate execution of the report generation procedures.

Figure 1:
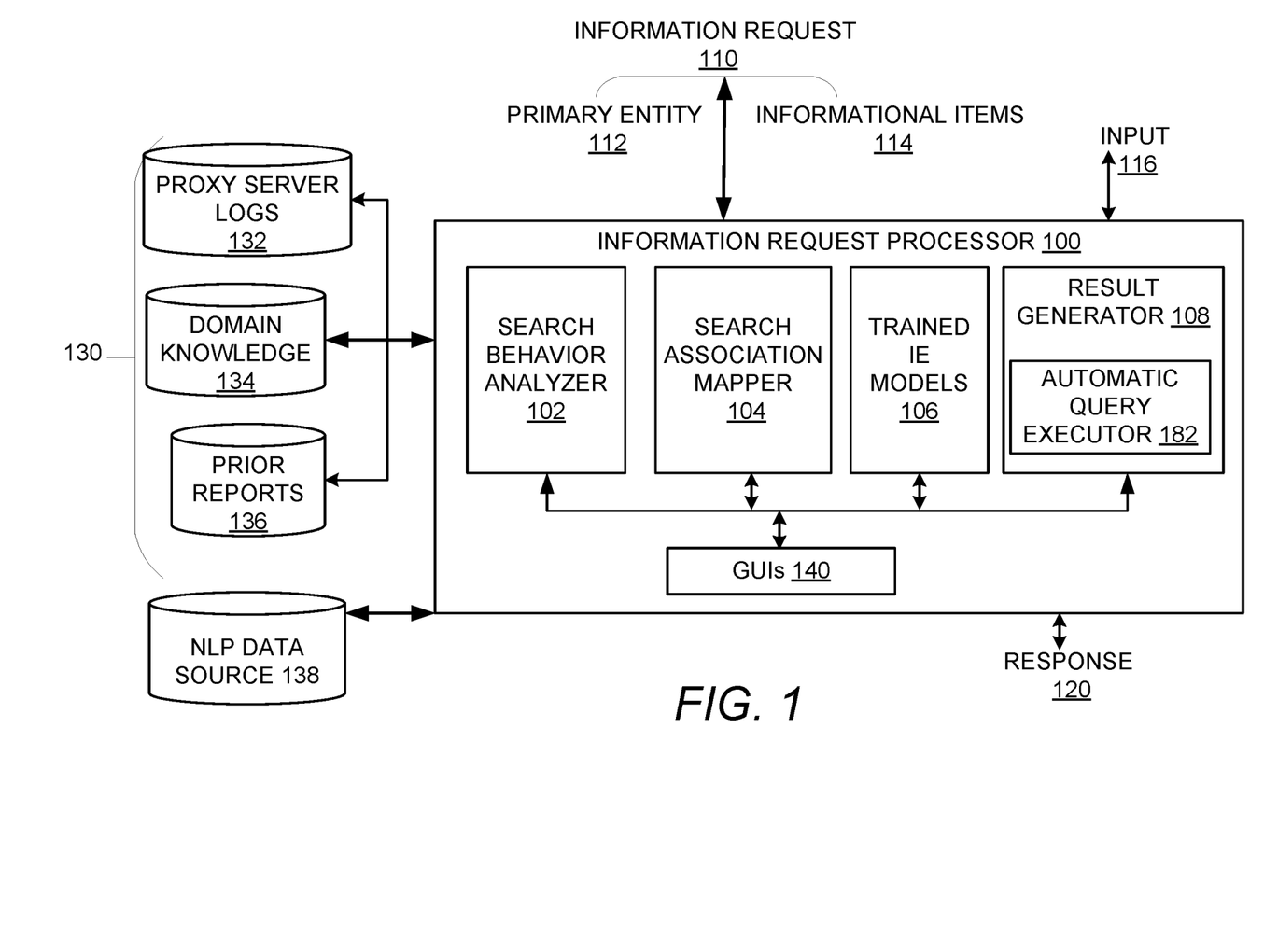
FIG. 1 is a block diagram of an information request processor in accordance with examples disclosed herein.

FIG. 1 is a block diagram of an information request processor 100 in accordance with examples disclosed herein. The information request processor 100 is configured to process an information request 110 received from a user, extract information relevant to the information request 110 from one or more of a plurality of data sources 130 and produce a response 120 relevant to the information request 110. The information request processor 100 includes a search behavior analyzer 102, a search association mapper 104, one or more trained information extraction (IE) models 106 and a result generator 108. The information request processor 100 may be associated with one or more GUIs that enable receiving information requests from users and enabling display of the responses or results generated for the information requests.

The information request 110 may be received via one of the GUIs 140 and can include a primary entity 112 and one or more informational items 114. The primary entity 112 can be the subject of the information request 110 while the informational items 114 can include particular items of information regarding the subject that are being requested. For example, if the information request 110 relates to number of employees at an organization, the primary entity 112 may be identified by the name of the organization and the informational items may include the terms "number of employees" or other equivalent phrases such as "staff strength" and the like. The information request 110 may be provided to the information request processor 100 via textual, voice or other interfaces.

The plurality of data sources 130 can include proxy server logs 132 that store browsing history collected by monitoring and capturing or recording activities from computers of individual users who previously worked on generating informational documents including reports as responses to prior information requests. Proxy servers are servers that act as intermediaries between one or more client devices seeking access to network resources such as other servers on the network such as the internet. Proxy servers can also log the various client device interactions which can be helpful for trouble shooting. Accordingly, when a user is generating an informational document such as a report in response to an information request, the various data sources accessed by the user, the search queries executed by the user and the search terms employed by the user and the results received by the user in response to the search queries are recorded in the proxy server logs. The proxy server logs 132 can include a collection of such logs from a plurality of proxy servers employed by many users who may be generating such reports.

The plurality of data sources 130 also include a data store of domain knowledge 134. The domain knowledge 134 may contain for example, structure of a report including the sections and sub-sections. For example, information requests for a domain may typically involve similar kind of information for various entities associated with the domain. Therefore, the reports generated for the domain may follow a standardized structure whereas the structures for reports from different domains may differ. Furthermore, the domain knowledge 134 may include parameters that are to be determined for an entity associated with the domain. For example, the geo of operations for an entity in the logistics domain may carry higher weight when compared to an entity in the domain of cloud service providers. In the latter case, the geo of operations carries lesser weight while the physical location of the cloud servers may carry higher weight. The plurality of data sources 130 may also include a data store with prior reports 136 which were generated for the various information requests. Therefore, the browsing history that was recorded during the process of creation of the reports in the data store of prior reports 136 is stored in the proxy server logs 132. In an example, the prior reports within the data store of prior reports 136 can be categorized into domains, based on the type of organizations or industries the primary entities of those prior reports are associated with. For example, a report regarding a primary entity in hardware manufacturing may be associated with a broader 'computer industry' domain or a more focused 'hardware manufacturer' domain. Similarly a report on a charitable institution may be categorized as 'non-profit' domain. Another data source for NLP 138 is also accessible by the information request processor 100 for linguistic analysis as detailed further herein.

The search behavior analyzer 102 analyzes the terms in the information request 110 to identify one or more of the data sources 130 that include information or that enable obtaining information responsive to the information request 110. The information request 110 is initially processed to identify the primary entity 112 and the informational items 114 provided to the information request processor 100. In an example, the primary entity 112 can include the name or other unique identifier of an organization (such as a ticker symbol) and the like. The search behavior analyzer 102 initially identifies a domain associated with the primary entity 112. Upon categorizing the primary entity 112 into a domain, the search behavior analyzer 102 selects the prior reports associated with the domain from the data store of prior reports 214 for further analysis. The search behavior analyzer 102 also accesses from the proxy server logs 132, the corresponding portions of browsing history that was created during the generation of the selected prior reports.

The selected prior reports and the browsing history are further analyzed in accordance with methodologies detailed herein to identify successful search queries and the search terms in the search queries that were used to obtain the information for the selected prior reports. In addition, the data sources such as the internet websites that were visited to obtain the information are also identified from the proxy server logs 132. Furthermore, the knowledge such as the structure information of the selected prior reports is also obtained from the domain knowledge 134.

A search association mapper 104 correlates the information obtained from each of the data sources 130 to establish meaningful associations. Associations can be therefore established between the search queries, search terms and data sources extracted from the proxy server logs 132 to the primary entities and the informational items extracted from the selected prior reports and the structure information etc obtained from the domain knowledge 134. The portions of the browsing history and the selected prior reports can be parsed and tokenized and the textual tokens thus generated can be compared and matched up to establish the necessary correlations. Trained IE models 106 can be employed to extract various search terms/entities from various sources including internet search results such as those included in the portions of the browsing history. Non-limiting examples of search terms can include names, contact information, locations, attributes such as financial information about an organization, staff strength, ratings, competitors of the organization and the like. In addition, NLP data source 138 is also coupled to the information request processor 100 that enables the search association mapper 104 to identify synonyms, acronyms and the like. For example, for 'headquarters' a synonym like 'main office' may be identified or a synonym like 'major players' can be identified for 'competitors'.

NLP techniques such as entity recognition, text matching and the like can be employed for matching the search terms extracted from the portions of the browsing history to the corresponding primary entities and informational items extracted from the selected prior reports. In an example, terms, synonyms, antonyms and other linguistic information from the NLP data source 138 can be employed for establishing the search associations. For example, for 'headquarters information' 'main office' may be used alternately or for 'competitors' a term of 'main players' may be used alternately. Such variation in terminology of the proxy server logs 132 and prior reports may be resolved by the NLP data source 138. Based on the matches thus established, the data sources that provided the necessary information for generating the selected prior reports may also be determined. The Universal Resource Locators (URLs) are thus mapped to the primary entities extracted from the prior reports. For example, a search query for the employee count of a company can be mapped to the corresponding report including the head count of the company and a search query, a query response from a particular website that provided the same number as included in the prior report may be determined as the successful query and the website recognized as an accurate information source for the head count of that company.

The result generator 108 presents the information or knowledge nuggets produced by the search association mapper 104 together with the domain knowledge including the report structure to a reviewer in a user-editable format. The reviewer may provide further input 116 validating the extracted information. The reviewer may further provide user edits rephrasing the successful search queries. For example, the reviewer may confirm the automated inferences made by the search association mapper 104 or the reviewer may tweak a successful search query by including the primary entity 112 and the other informational items 114 and execute it on one or more selected information sources to obtain the requisite information for generating a response 120 including a report with the data relevant to the information request 110. The reviewer may select a prior report as a template or may design the structure for the report anew. In an example, one of the GUIs 140 may present the report or the report may be transmitted to other users via email, fax or placed in a designated folder of a data store.

In an example, the result generator 108 may be further configured for automatic generation of the response 120 to the information request 110 without the necessity for user intervention. An automatic query executor 182 is configured to execute successful search queries identified by the search association mapper 104 on selected information sources or websites. In an example, the selected websites can include those websites on which the successful search queries were earlier executed while being recorded on the proxy server logs 132. Based on the information from the NLP data source 138 and the informational items 114, the result generator 108 can determine if a search query that enabled generation of a prior report can be used to satisfy the information request 110 with a substitution of the prior entity identifier with the primary entity 112. If it is possible to generate the response 120 with the substitution, the result generator 108 can be configured to automatically rephrase the search query to generate one or more new queries with the identifier of the primary entity 112 and automatically execute the new queries to obtain the response 120 to the information request 110. The information source to execute the search query may also be similarly selected. If the prior search query was executed on a general-purpose search engine, the same information source may be selected for the automatic execution of the new query in order to generate a new report for the information request 110. If the prior search query was executed on an entity-specific information source such as a company website, then the rephrased search query may be executed via a default information source such as a general purpose search engine which may be configured for the result generator 108.

Figure 2:
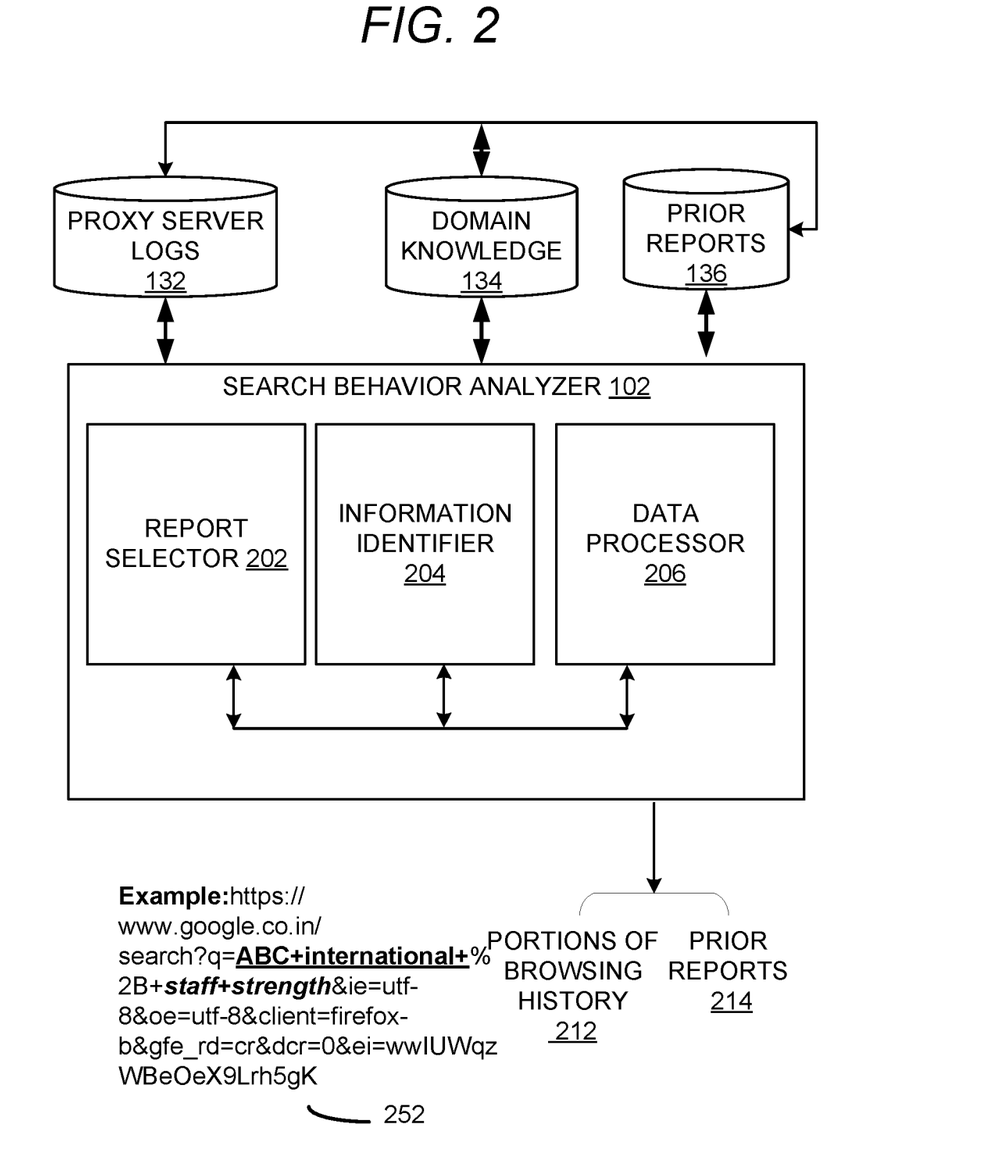
FIG. 2 shows a block diagram of a search behavior analyzer in accordance with the examples disclosed herein.

FIG. 2 shows a block diagram of the search behavior analyzer 102 in accordance with the examples disclosed herein. The search behavior analyzer 102 includes a report selector 202, an information identifier 204 and a data processor 206 for identifying one or more of the data sources 130 and search queries that can satisfy the information request 110. The report selector 202 selects one or more prior reports 214 from the prior reports 136 database based on the primary entity 112 associated with the information request 110. The primary entity 112 enables identifying a domain for the information request and accordingly one or more other entities that were previously searched for within the domain. Accordingly, the prior reports 214 including or otherwise associated with the one or more other entities are selected from the data source of the prior reports 136. In an example, the reports may also be selected based on predetermined date ranges, keyword searches, user ids of the people responsible for the reports and the like. The selection of the prior reports 214 enables the information identifier 204 to pull from the proxy server logs 132, the portions of browsing history 212 that were generated during the process of creating the prior reports 214. An example of the portions of browsing history 212 that are pulled is the proxy server log entry 252 showing a GOOGLE search for the staff strength of ABC International. One or more of such portions of the browsing history 212 can be obtained based on the dates of creation of the prior reports 214 so that the proxy server log entries created with a predefined time period preceding the report creation dates can be selected to obtain the portions of the browsing history 212. In an example, the portions of the browsing history 212 may be further processed to remove personal browsing logs. The data processor 206 can parse and tokenize the prior reports 214 and the portions of the browsing history 212 for further analysis.

Figure 3:
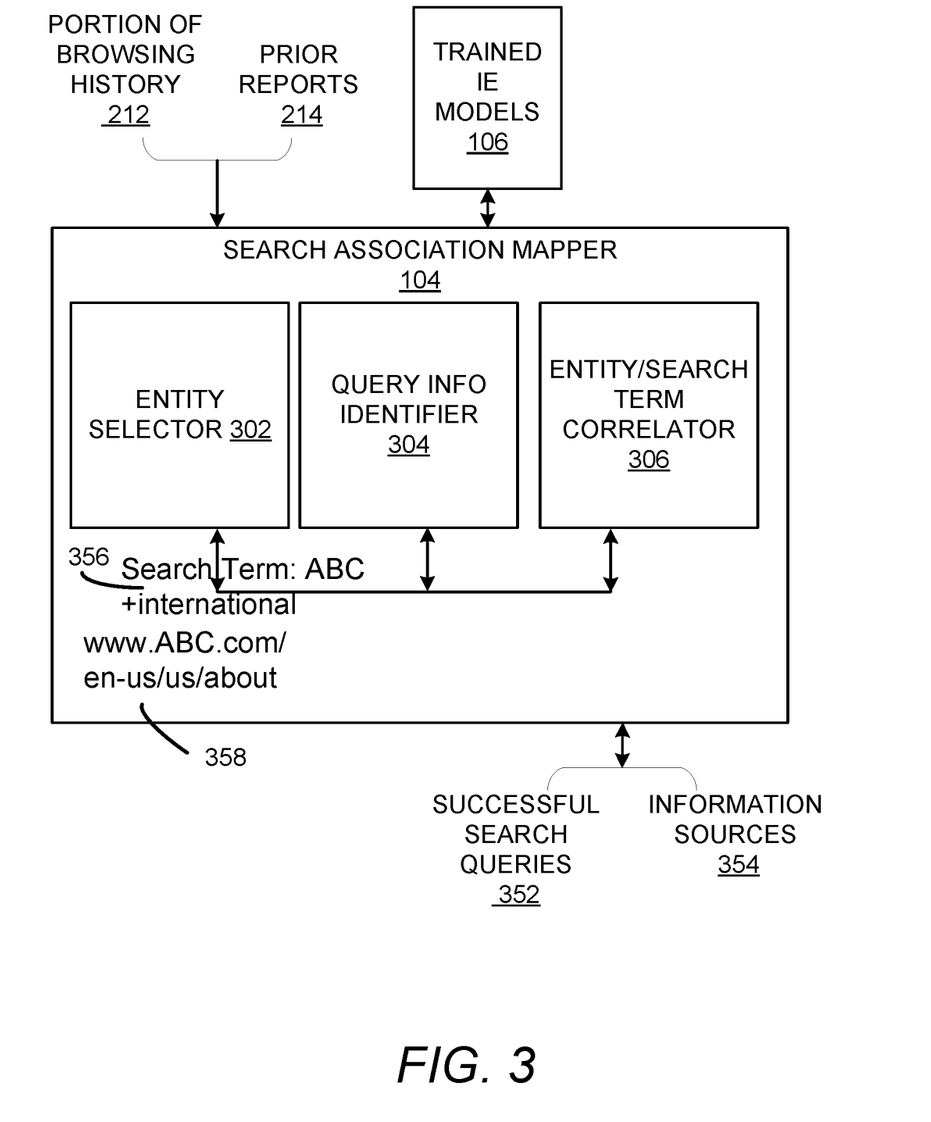
FIG. 3 shows a block diagram of a search association mapper in accordance with the examples disclosed herein.

FIG. 3 shows a block diagram of the search association mapper 104 in accordance with examples disclosed herein. The search association mapper 104 includes an entity selector 302, a query info identifier 304 and an entity/search term correlator 306. The entity selector 302 selects one or more entities from the tokenized output of the prior reports 214 obtained from the search behavior analyzer 102. Entity recognition (ER) techniques can be employed by the entity selector 302 for identifying the entities. The query info identifier 304 recognizes, from the portions of the browsing history 212, requisite information which can include but is not limited to search terms used, information sources that were employed and search queries that were used for generating the prior reports 214. The query info identifier 304 can use trained IE models 106 to extract various search terms/entities from the portions of the browsing history. The query info identifier 304 may further use AI elements such as trained classifiers to look for particular arrangements of string characters that are indicative of a browser-based search queries. In an example, specific search terms such as entity names for example, 'ABC International' 356 and/or entity attributes such as 'staff strength' 358 that occur within search queries that are usually executed for generating the reports may also be used in the query identification.

The entity/search term correlator 306 correlates the results from the portions of the browsing history 212 to the information in the prior reports 214. The search queries whose results in the portions of the browsing history 212 match the information in the prior reports 214 can be determined by the entity/search term correlator 306 as the successful search queries that enabled the creation of the prior reports 214. Furthermore, the information sources such as the websites on which the successful search queries 352 were executed may also be recorded by the entity/search term correlator 306 as likely information sources 354 that may satisfy the information request 110. The websites may be general-purpose search engines or domain specific resources. In an example, the website may pertain to platforms that provide dynamically varying data such as prices of items in a commodity marketplace and the like. Furthermore, such domain specific websites may involve authentication procedures. The entity/search term correlator 306 may indicate such authentication-based websites and provide the necessary log in information for accessing the websites if available. Certain examples of the search association mapper 104 may be configured for automatic log in to subscription databases where the log in credentials are stored within the information request processor 100.

Figure 4:
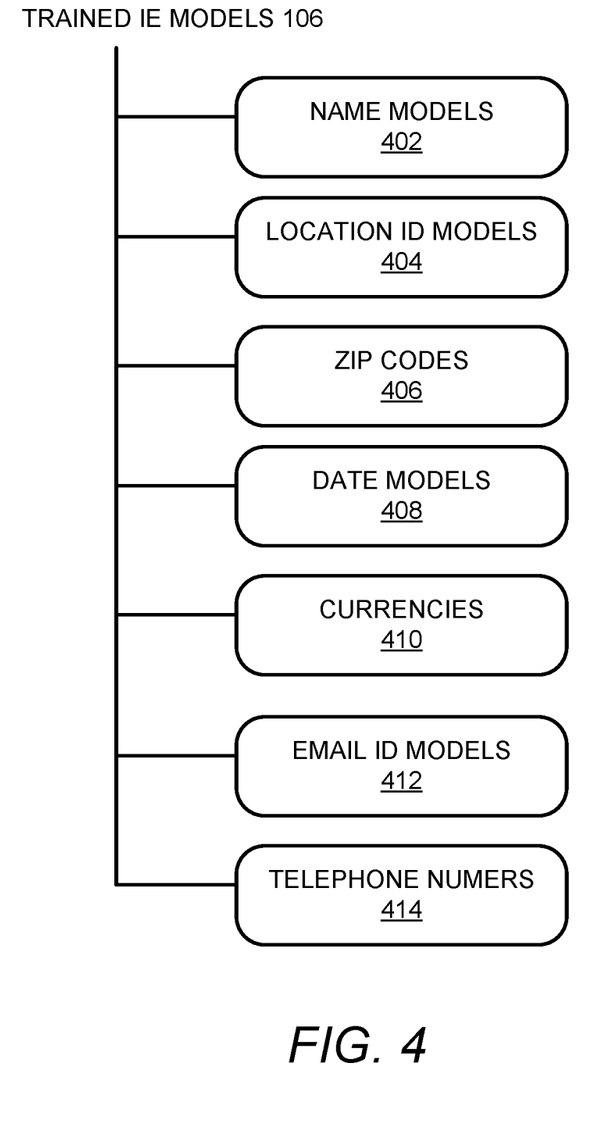
FIG. 4 shows a diagram of some examples of trained Information Extraction (IE) models that can be employed for identifying various entities/search terms.

FIG. 4 shows a diagram of the trained IE models 106 that can be employed for identifying various entities/search terms from different internal and external data sources such as live internet search results or logs of search results such as those in the proxy server logs 132 and the like. Trained IE models 106 can include various classifiers that learn to identify various entities/search terms and informational items 114 or entity attributes from the tokens generated by the search behavior analyzer 102. The IE models 106 may be trained via supervised learning or unsupervised learning to identify the various entities. Entity name models 402 can be trained to identify various proper nouns occurring in the portions of the browsing history 212 and the prior reports 214. Similarly, classifiers may be used for location id models 404 that can identify geographic locations in terms of latitude and longitudes, zip codes 406 which can identify global locations based on their local zip codes, date models 408 that can identify dates presented in various formats, currencies 410 which identify amounts in various currencies such as dollar amount ids, email id models 412, telephone numbers 414 and the like. It can be appreciated that the list shown in FIG. 4 and described herein is solely for illustration purposes and is not an exhaustive list. As newer reports are created and used by the information request processor 100, newer entities may be identified and newer IE models may be trained and included within the information request processor 100 for identification of such entities.

Figure 5:
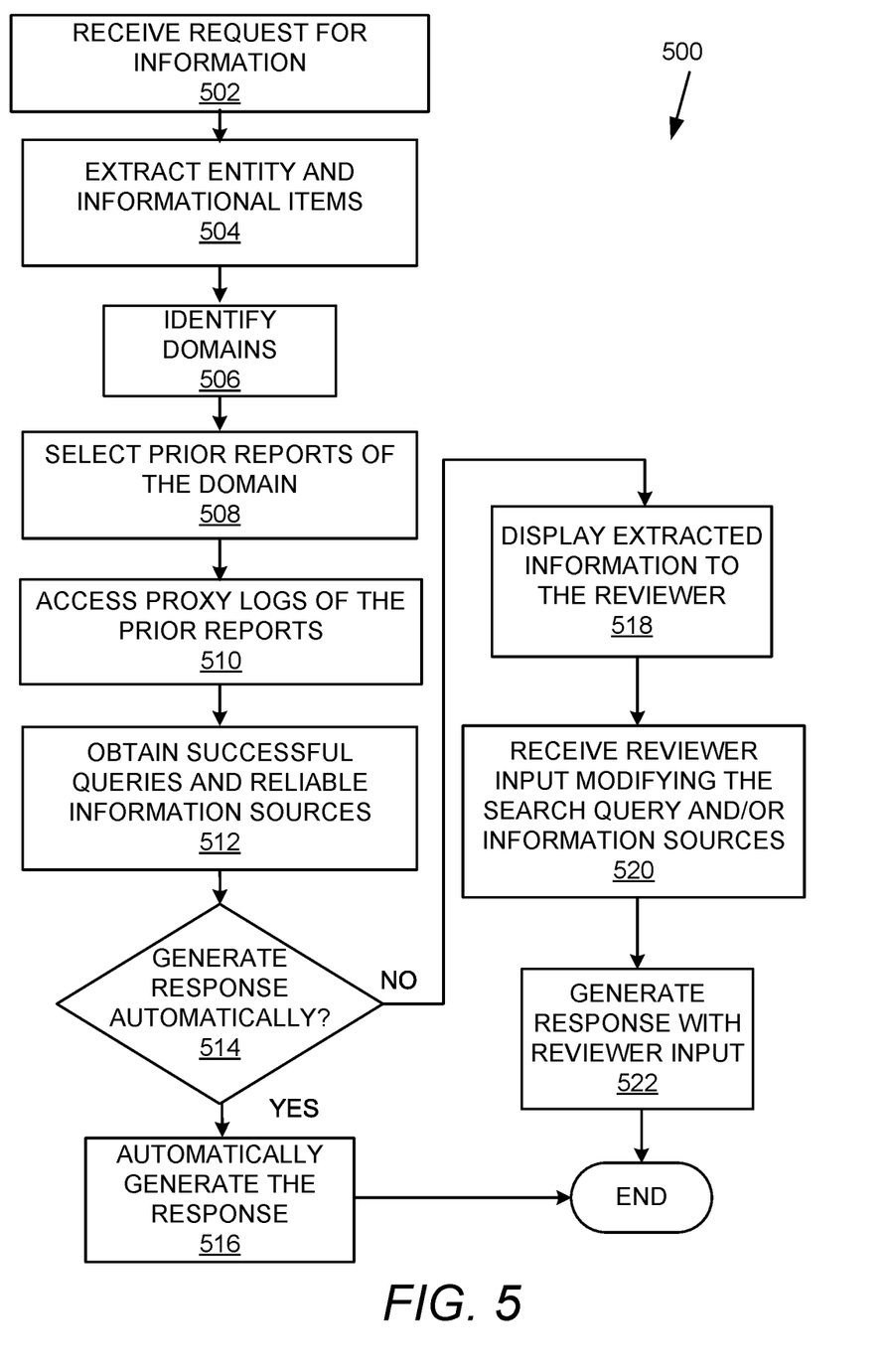
FIG. 5 is a flowchart that details a method of responding to an information request in accordance with the examples disclosed herein.

FIG. 5 is a flowchart 500 that details a method of processing an information request in accordance with examples disclosed herein. The method begins at 502 wherein an information request 110 including the primary entity 112 and one or more informational items 114 is received. The primary entity 112 and the one or more informational items 114 are extracted from the information request at 504. One or more domains associated with the information request 110 are identified at 506. A plurality of domains may be defined based on one or more of the primary entity 112 and the informational items 114 within the information request processor 100 so that a received information request can be categorized into one or more domains to enable further processing. The domains can include an organization and/or particular type of information regarding the organization. For example, a company name may be classified under a domain. In another case, particular information regarding the company such as its production capacity, financial information, locations and the like may be associated with multiple domains.

Based on the domains identified at 506, the prior reports 214 which were earlier generated by the information request processor 100 for the same primary entity 112 or for other primary entities with or without similar informational items 114 as the information request 110 are selected at 508. The proxy logs associated with the selected prior reports are accessed at 510. At 512, the successful search queries that enabled generation of the selected prior reports are obtained. In an example, the information sources on which the successful search queries were executed can be identified as the reliable information sources that provided the information for the prior reports 214. Accordingly, such reliable information sources may also be obtained at 512. At 514 it is determined if a response 120 to the information request 110 is to be generated automatically. The determination on the automatic response generation may be based on the comparison of informational items 114 from the information request 110 to search terms in the successful search queries as detailed herein. If it is determined at 514 that the response 120 can be automatically generated, then the response is automatically generated at 514. Automatic response generation can include performance of a search of internal and external data sources using the one or more successful search queries 352 and employing the trained IE models 106 to extract the information for the new report from search results obtained from the performance of the search on the internal and external data sources. The response can be generated from the information extracted by the trained IE models 106 from the search results obtained upon the performance of the search. If it is determined at 514 that the response 120 cannot be automatically generated, the method moves to 518 to generate response 120 with reviewer/manual input.

In an example, if the response 120 cannot be automatically generated based on the comparison of the successful search queries with the informational items 114, the extracted information including the successful search queries and the information sources such as the websites on which the successful search queries were executed are displayed to a reviewer at 518. At 520, the reviewer may validate or further rephrase one or more of the successful search queries. In an example, the reviewer may select or add new information sources at 520 to execute the successful search queries to receive the response 120 to the information request 110. The response 120 is generated with the reviewer input at 522. In an example, the reviewer's input may be used as an explicit training mechanism so that the reviewer's selected information sources may be determined as more accurate for the particular domain and the rejected queries/information sources may be considered as less accurate or less useful for the domains identified at 506. The response 120 thus generated either automatically or with user input may be added to the domain-specific knowledge associated with one or more domains relevant to the response 120.

Figure 6:
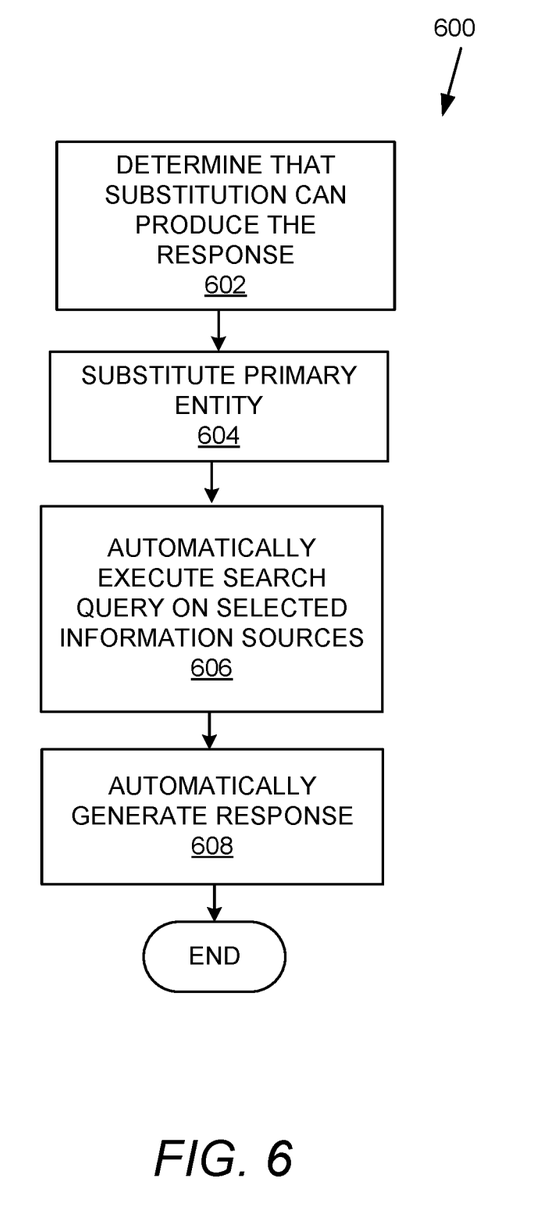
FIG. 6 is a flowchart that details a method of automatically generating a response to the information request in accordance with examples disclosed herein.

FIG. 6 is a flowchart 600 that details a method of automatically generating the response 120 to the information request 110 in accordance with examples disclosed herein. The response 120 to the information request 110 can be automatically generated if it is determined at 602, that a substitution of the primary entity 112 to a search term can generate the response 120. Such determination can be made if the informational items 114 within the information request 110 match the informational items in the successful query so that substitution of one entity for another can generate the correct results thereby enabling the information request processor 100 to automatically generate the response 120. NLP techniques may be employed along with the information from the NLP data source 138 in order to make the determination at 602 so that if the successful query uses search terms synonymous with the informational items 114 then such a search query can be used for the automatic response generation. Moreover, the determination at 602 also includes a determination regarding whether the information sources used for the successful query can work to produce the results after substitution with the primary entity 112. In an example, if the successful query was executed on a general-purpose search engine, the method may proceed with the automatic response generation. Else, if the successful query was executed on a website or information source that was specific to the search term, then the method may switch to manual generation of the response 120.

At 604, the primary entity is substituted for the search terms in the successful query so that the successful query which is now rephrased with the primary entity is automatically executed on the information sources at 606. At 608, the response 120 which may include a report is automatically generated. The automatic generation of the response at 608 may include a selection of the default structure for the report. For example, each of the plurality of domains defined within the information request processor 100 may have a default report structure associated therewith which can be used in the automatic response generation at 608.

Figure 7:
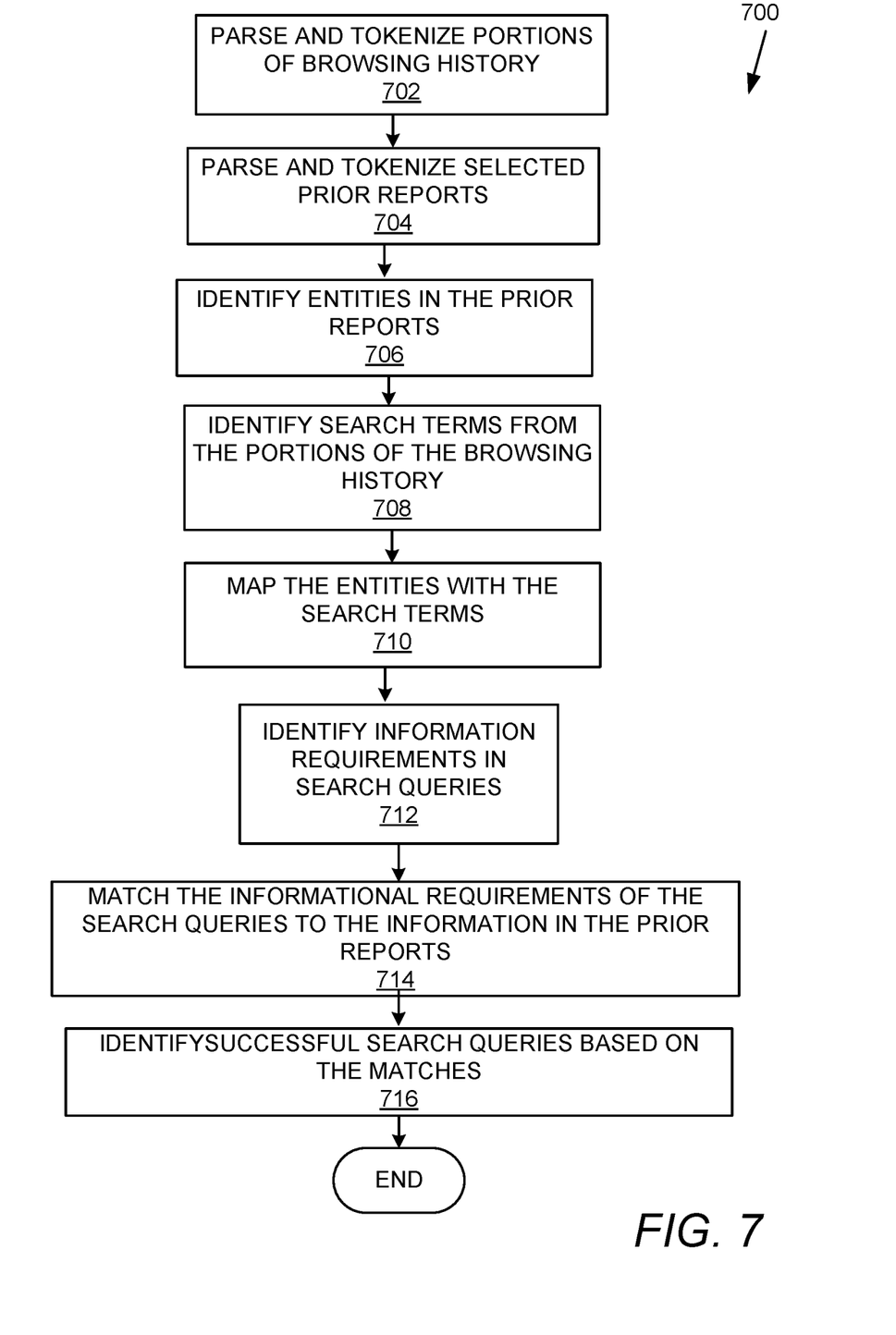
FIG. 7 is a flowchart that details a method of identifying successful search queries in accordance with the examples disclosed herein.

FIG. 7 is a flowchart 700 that details a method of identifying successful search queries. The method begins at 702 wherein the portions of the browsing history 212 that correspond to the prior reports 214 are parsed and tokenized. Accordingly, a plurality of string tokens indicating various search terms that were used, search information resources such as the Universal Resource Locators (URLs) where the search was done, the search results that were received in response to the search queries from the various URLs and the like are obtained at 702. At 704, the prior reports 214 are parsed and tokenized to obtain the entities, the informational items and the data included in the reports at 706. Similarly, at 708, the search terms used in the various search queries are identified from the tokenized output obtained at 702. The search terms obtained from the portions of the browsing history 212 are mapped to the entities extracted from the prior reports at 710. Moreover, the informational requirements in the search queries are identified at 712. The informational requirements in the search queries are matched to the information in the prior reports at 714. The successful search queries are therefore identified via analysis of information included in one or more of the sections and sub-sections of the prior reports. More particularly, the successful search queries are identified at 716 based on the matches between the informational requirements in the search queries to the information included in the prior reports. Other considerations such as timings of the execution of the search queries may also be considered for the identification of the successful search queries at 716. In an example, when two queries need to be resolved in order to accurately identify a successful search query, the information request processor 100 may be configured to retrieve the timestamps of the search queries and select the search query with a later time stamp as the successful search query.

Figure 8:
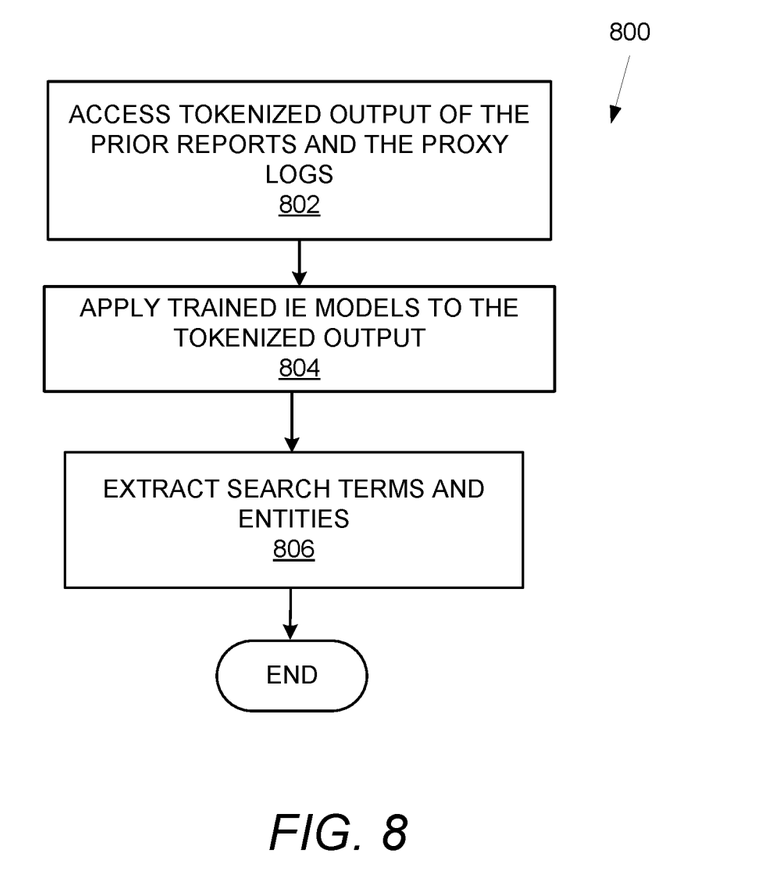
FIG. 8 is a flowchart that details a method of extracting data from the output of the search behavior analyzer in accordance with the examples disclosed herein.

FIG. 8 is a flowchart 800 that details a method of extracting data from the output of the search behavior analyzer 102 in accordance with examples disclosed herein. The method begins at 802 wherein the tokenized output of the prior reports and the proxy logs is accessed. The trained IE models 106 are applied to the tokenized output for recognition of the entities and search terms at 804. The entities and the search terms are extracted at 806 respectively from the prior reports 214 and the portions of the browsing history 212. Application of the IE models 106 for extracting search terms, entities and the like enables a more accurate collection of information from greater number of information resources within a shorter time period as compared to manual reviews of the information sources.

Figure 9:
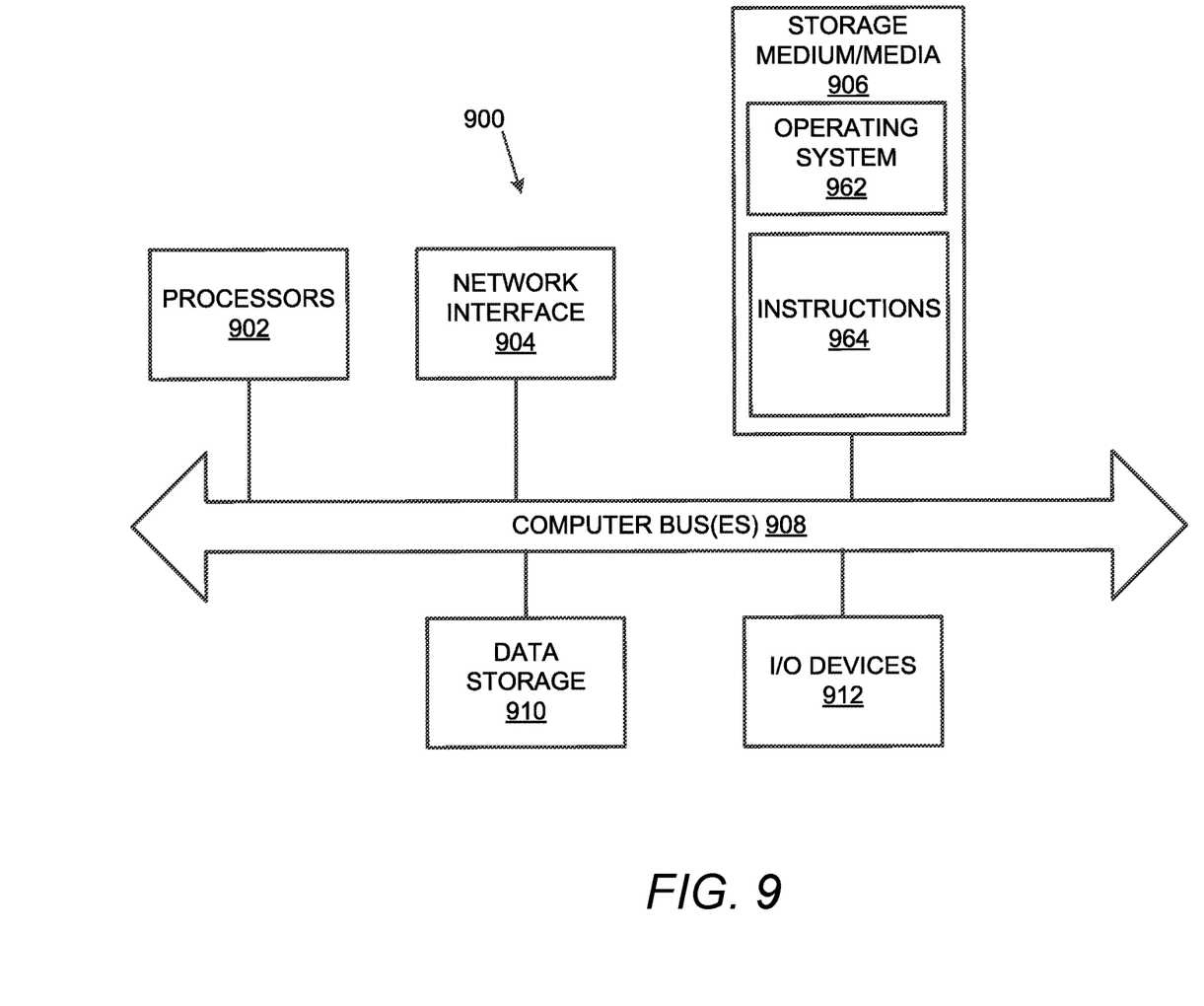
FIG. 9 is a block diagram that details an example of a computer system that may be used to implement the information request processor.

FIG. 9 illustrates a computer system 900 that may be used to implement the information request processor 100. More particularly, computing machines such as desktops, laptops, smartphones, tablets, wearables which may be used to generate or access the data from the information request processor 100 may have the structure of the computer system 900. The computer system 900 may include additional components not shown and some of the components described may be removed and/or modified. In another example, a computer system 900 can sit on external-cloud platforms such as, Amazon Web Services, or internal corporate cloud computing clusters, or organizational computing resources, etc.

The computer system 900 includes processor(s) 902, such as a central processing unit, ASIC or other type of processing circuit, input/output devices 912, such as a display, mouse keyboard, etc., a network interface 904, such as a Local Area Network (LAN), a wireless 802.11x LAN, a 3G or 4G mobile WAN or a WiMax WAN, and a computer-readable medium 906. Each of these components may be operatively coupled to a bus 908. The computer-readable medium 906 may be any suitable medium which participates in providing instructions to the processor(s) 902 for execution. For example, the computer-readable medium 906 may be non-transitory or non-volatile medium, such as a magnetic disk or solid-state non-volatile memory or volatile medium such as RAM. The instructions or modules stored on the computer-readable medium 906 may include machine-readable instructions 964 executed by the processor(s) 902 to perform the methods and functions of the information request processor 100.

The information request processor 100 may be implemented as software stored on a non-transitory computer-readable medium and executed by the one or more processors 902. For example, the computer-readable medium 906 may store an operating system 962, such as MAC OS, MS WINDOWS, UNIX, or LINUX, and code 964 for the information request processor 100. The operating system 962 may be multi-user, multiprocessing, multitasking, multithreading, real-time and the like. For example, during runtime, the operating system 962 is running and the code for the information request processor 100 is executed by the processor(s) 902.

The computer system 900 may include a data storage or non-transitory computer readable storage medium 910, which may include non-volatile data storage. The data storage 910 stores data used by the information request processor 100. The data storage 910 may be used to store the tokenized output of the search behavior analyzer 102, the associations established between the various entities and the search terms, the trained IE models 106 and the like.

The network interface 904 connects the computer system 900 to internal systems for example, via a LAN. Also, the network interface 904 may connect the computer system 900 to the Internet. For example, the computer system 900 may connect to web browsers and other external applications and systems via the network interface 904.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims and their equivalents.

What is claimed is:

1. An information request processing system comprising:
   at least one processor;
   a non-transitory computer readable medium storing machine-readable instructions that cause the at least one processor to:
   identify one or more prior reports that are relevant to a primary entity associated with a new report to be generated;
   access browsing history from proxy server logs captured during report creation procedures of the one or more prior reports;
   determine, by employing trained information extraction (IE) models, one or more successful search queries from portions of the browsing history, the successful search queries used for generating the prior reports; and
   determine if one or more of the successful search queries provide information for the new report,
   if one or more of the successful search queries provide information for the new report,
      perform a search of internal and external data sources using the one or more successful search queries that provides the information for the new report,
      employ the trained IE models to extract the information for the new report from search results obtained from the performance of the search, and
      generate the new report using the information extracted by the trained IE models from the search results obtained upon the performance of the search on the internal and external data sources,
   else if the one or more successful search queries do not provide information for the new report,
      provide for display in a user-editable format, one or more of the successful search queries, information sources that were used with the successful search queries and the prior reports for enabling generation of the new report.

2. The information request processing system of claim 1, the machine-readable instructions for performing a search of internal and external data sources using the one or more successful search queries further comprising instructions that cause the processor to:
   automatically generate one or more new queries by replacing one or more search terms in the successful search queries with the primary entity.

3. The information request processing system of claim 2, the machine-readable instructions for employing the one or more successful search queries to generate the new report further comprising instructions that cause the processor to:
   automatically execute the new queries on one or more of the information sources used in the successful search queries to obtain the search results.

4. The information request processing system of claim 3, the machine-readable instructions for employing the one or more successful search queries to generate the new report further comprising instructions that cause the processor to:
   generate the new report based on the information extracted by the trained IE models on the results from the automatic execution of the new queries on the information sources, wherein the information sources are included in the internal and external data sources.

5. The information request processing system of claim 1, the machine-readable instructions further comprising instructions that cause the processor to:
   generate the new report based on user edits to at least one of the successful search queries and the information sources if the one or more successful search queries do not provide information for the new report.

6. The information request processing system of claim 5, wherein the machine-readable instructions for generating the new report further comprising instructions that cause the processor to:
   receive as one of the user edits, the primary entity to be used as a search term in one or more of the successful search queries to be executed on at least one of the information sources.

7. The information request processing system of claim 1, wherein the information sources include at least a general-purpose search engine and a domain-specific website.

8. The information request processing system of claim 1, the machine-readable instructions for determining the successful search queries further comprising instructions that cause the processor to:
   select the portions of browsing history from the proxy server logs corresponding to the prior reports;
   identify one or more search queries from the portions of the browsing history;
   extract search terms from the search queries by employing the trained information extraction (IE) models;
   extract entities from the prior reports; and
   map the search terms extracted from the search queries to the entities extracted from the prior reports.

9. The information request processing system of claim 8, further comprising instructions that cause the processor to:
   determine the successful search queries via the mapping of the entities in the reports to the search terms.

10. The information request processing system of claim 8, further comprising instructions that cause the processor to:
   identify a domain associated with the primary entity based on one or more of the primary entity, the prior reports, the search terms and the information sources.

11. The information request processing system of claim 8, the machine-readable instructions further comprising instructions that cause the processor to:
   map Universal Resource Locators (URLs) in the portions of the browsing history to the entities extracted from the prior reports.

12. The information request processing system of claim 1, the machine-readable instructions further comprising instructions that cause the processor to:
   parse and tokenize the portions of the browsing history.

13. The information request processing system of claim 1, the machine-readable instructions for selecting portions of the browsing history further comprising instructions that cause the processor to:
   select the portions of the browsing history created in the proxy server logs during a predetermined date range that precedes dates of creation of the prior reports.

14. The information request processing system of claim 1, wherein the trained IE models comprise models for one or more of proper nouns, location ids, dates, dollar amount ids, address ids, zip codes, email ids.

15. The information request processing system of claim 1, further comprising instructions that cause the processor to:
   add the new report to domain specific knowledge associated with a corresponding domain of the new report.

16. A method of processing an information request comprising:
   receiving a request for generating a new report, the request including at least a primary entity;
   identifying one or more prior reports that are relevant to the primary entity;
   accessing proxy server logs captured during report creation procedures of the one or more prior reports;
   selecting portions of browsing history from the proxy server logs corresponding to the prior reports based at least on dates of the prior reports;
   identifying one or more search queries from the portions of the browsing history using natural language processing (NLP) techniques;
   extracting search terms from the search queries by employing trained information extraction (IE) models;
   parsing and tokenizing the prior reports;
   extracting entities associated with the prior reports based on the parsing;
   mapping the search terms extracted from the search queries to the entities extracted from the prior reports;
   determining one or more successful search queries from the search queries in the portions of the browsing history, the successful search queries generating the information for the prior reports and the successful search queries being determined via the mapping of the search terms to the entities in the reports;
   extracting information sources used for the prior reports from the successful search queries; and
   providing for display in a user-editable format, one or more of the successful search queries, the information sources and the prior reports for enabling generation of the new report.

17. The method of claim 16, further comprising:
   receiving user input that further validates the mapping of the search terms to the entities.

18. The method of claim 16, further comprising:
   identifying the successful search queries via analysis of information included in one or more of sections and sub-sections of the prior reports.

19. A non-transitory computer-readable storage medium comprising machine-readable instructions that cause a processor to:
   receive a request for generating a new report, the request including at least a primary entity;
   identify one or more prior reports that are relevant to the primary entity;
   access proxy server logs captured during report creation procedures of the one or more prior reports;
   determine one or more successful search queries from search queries in browsing history captured by the proxy server logs, the successful search queries generating information for the prior reports;
extract information sources used for the prior reports from the successful search queries; and
determine if one or more of the successful search queries provide information for the new report by employing trained information extraction (IE) models,
if one or more of the successful search queries provide information for the new report,
employ the one or more successful search queries that provide information for the new report to generate the new report,
else if the one or more successful search queries do not provide information for the new report,
provide for display in a user-editable format, one or more of the successful search queries, the information sources and the prior reports for enabling generation of the new report.

20. The non-transitory computer-readable storage medium of claim 19, wherein instructions to determine the successful search queries from the browsing history further comprising machine-readable instructions that cause the processor to:
retrieve timestamps associated with the search queries in the browsing history; and
identify one or more of the search queries with later timestamps as the successful search queries.

* * * * *